Nov. 16, 1954     A. J. HUCK ET AL     2,694,769
HEATING ELEMENT FOR VACUUM TYPE
COFFEE MAKERS AND THE LIKE
Filed April 22, 1950     2 Sheets-Sheet 1
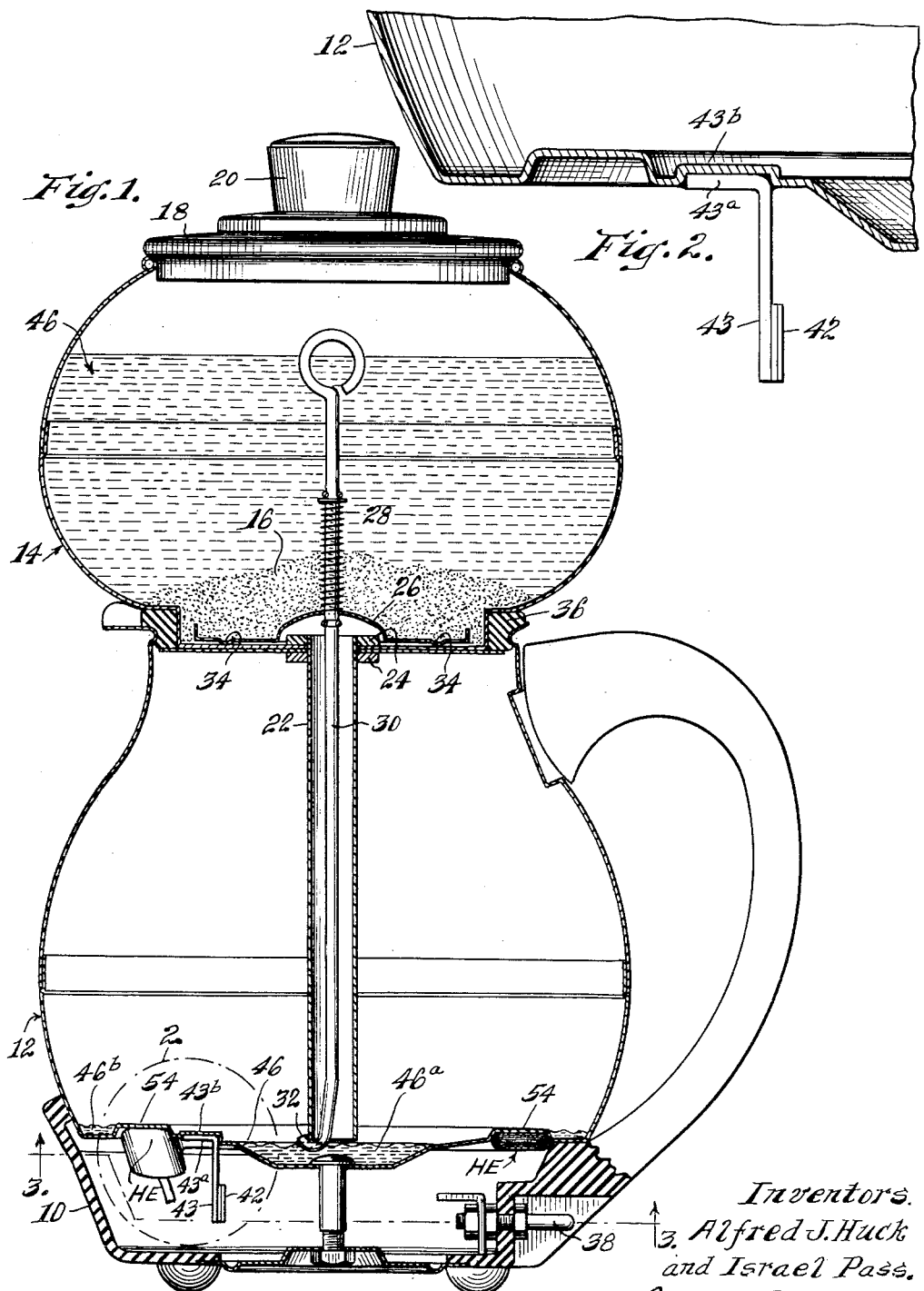
Inventors.
Alfred J. Huck
and Israel Pass.
By Bair, Freeman
& Molinare Atty's.

Nov. 16, 1954

A. J. HUCK ET AL 2,694,769

HEATING ELEMENT FOR VACUUM TYPE COFFEE MAKERS AND THE LIKE

Filed April 22, 1950

Inventors.
Alfred J. Huck
and Israel Pass.
By Bair, Freeman
& Molinare Attys.

United States Patent Office 2,694,769
Patented Nov. 16, 1954

2,694,769

HEATING ELEMENT FOR VACUUM TYPE COFFEE MAKERS AND THE LIKE

Alfred J. Huck and Israel Pass, St. Louis, Mo., assignors to Knapp-Monarch Company, St. Louis, Mo., a corporation of Delaware Application April 22, 1950, Serial No. 157,578

1 Claim. (Cl. 219—44)

This invention relates to a heating element and more particularly to the securing thereof to the bottom of the lower bowl of a vacuum type coffee maker or other vessel so as to provide an efficient, simple, and readily serviceable heating element construction.

In electrical appliances of the type having a vessel for liquid such as water, to the bottom of which a heating element is secured, it is desirable to have high efficiency in the conductivity of heat from the resistance wire of the heating element to the vessel bottom. This is particularly desirable in connection with a vacuum-type coffee maker in order to provide one which makes coffee properly in a minimum of time as will hereinafter be disclosed.

It is therefore an object of our invention to provide a heating element having specific characteristics and secured by means of soft solder to the bottom of a vessel to obtain high thermal efficiency and at the same time provide for ready servicing of the appliance in case the heating element becomes inoperative, the construction disclosed permitting ready replacement of the inoperative heating element by a new one.

A further object is to provide a heating element assembly of minimum mass and thermal inertia housed in a tubular sheath of high thermal conductivity, and an efficient means of connecting the same to the bottom of a vacuum type coffee maker or the like to insure high thermal efficiency in the transmission of heat from the element to the vessel.

With these and other objects in view, our invention consists in the construction, arrangement and combination of the various parts of our heating element, whereby the objects contemplated are attained, as hereinafter more fully set forth, pointed out in my claims and illustrated in the accompanying drawings, wherein:

Figure 1 is a vertical sectional view through a vacuum type coffee maker employing our present invention.

Figure 2 is an enlarged sectional view of the portion of Figure 1 within the circle 2 showing particularly the shape of the lower vessel or bowl of the coffee maker to adapt it for our heating element.

Figure 3:
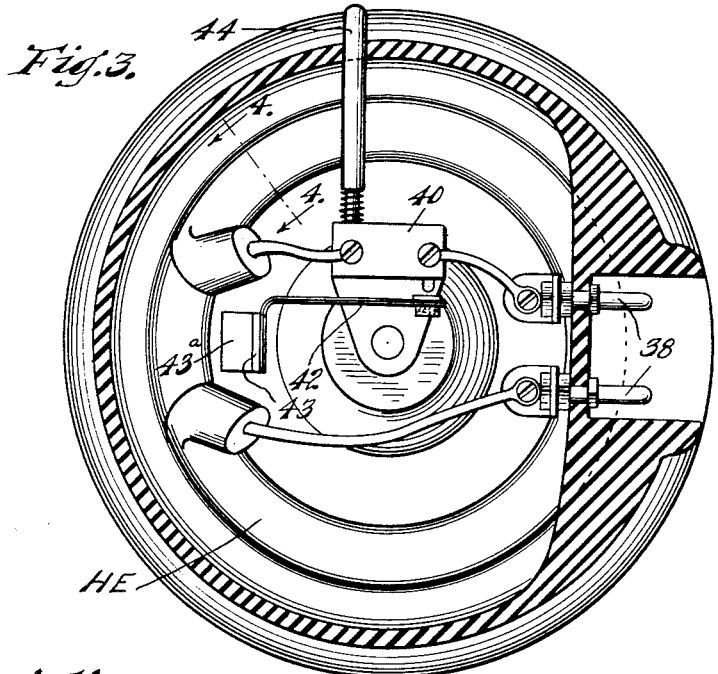
Figure 3 is a sectional view on the line 3—3 of Figure 1.

To understand clearly the problems finally solved with the heating element construction herein disclosed, a brief description of the characteristics of an electrically heated automatic vacuum type coffee maker is helpful. Figure 1 illustrates such a coffee maker wherein the element 10 is a supporting base, 12 is a lower bowl adapted to initially receive water, 14 is an upper bowl adapted to initially receive the ground coffee indicated at 16, and 18 is a lid for the upper bowl. A knob 20 is provided on the lid 18 for handling it and the upper bowl is provided with a depending transfer tube 22. The transfer tube may be secured to the bottom of the upper bowl 14 by any suitable means such as lock nuts 24.

A filter is illustrated in the form of a metal disc 26 held in position by a spring 28 on a stem 30, hooked as at 32 to the lower end of the transfer tube 22. The filtering space is represented by the lower surface of the disc 26 and the upper surface of the bottom of the bowl 14, which space is predetermined by means of three projections 34 formed on the disc 26 and their heights of course limiting the space between the surfaces just mentioned through which the coffee brew may pass to the exclusion of the ground coffee 16.

In the operation of a coffee maker of the character disclosed, the lower bowl 12 is filled with the desired quantity of water after which the upper bowl 14 is positioned against a sealing gasket 36 between the two bowls. The ground coffee 16 is then placed in the upper bowl after the filter 26 is positioned and a heating element HE for the lower bowl 12 is then energized.

Referring to Figure 3, the heating element HE is shown as connected with current supply terminals 38, with a thermal cut-out switch 40 interposed in series with the heating element, the switch being operated by a bimetal element 42 as to its trip-off position and manually actuated by a reset button 44 for energizing the heating element HE at the beginning of a coffee making operation. The bimetal element 42 is secured to a heat conductor (metal) bracket 43 having a foot 43a which is soldered, brazed or welded in a depression 43b of the bowl bottom. The details of the automatic control 40—42 illustrated are not part of our present invention and accordingly are not described in detail.

Energization of the heating element HE results in heating the water in the lower bowl to approximately the boiling point whereupon steam forms above the water and builds up sufficient pressure to force the water upwardly through the transfer tube 22 into the upper bowl, this tube being the only escape path for the water. The heating of the water and its transfer to the upper bowl, which condition is illustrated in Figure 1, may be referred to as the "heat-up" time. The water in the upper bowl is referred to as 46 and a central pool of water 46a and an annular pool of water 46b remain in the lower bowl.

Within approximately one minute after this "heat-up" time, it is desirable that the thermal cut-out 40 open to de-energize the heating element. This one minute of time in the coffee-making cycle may be referred to as the "switch cut-off" time.

After the hot water has all entered the upper bowl, and until the lower bowl has cooled sufficiently to cause a vacum therein which draws the brewed coffee back into the lower bowl, a time period occurs which may be referred to as the "brew" time. The subsequent time required for the brew to actually filter through the filter and enter the lower bowl may be referred to as the "filter" time. The brew time should be short as will hereinafter appear and the filter time of course is determined by the spacing between the filter plate 26 and the bottom of the bowl 14.

The accumulation of the above-noted timings may be referred to as the "coffee-making" time. This entire time is desirably as short as possible. Obviously, to minimize the entire time, each of the individual parts of the total time must be minimized.

Considering the heat-up time, minimum timing is had if there is maximum efficiency in transfer of heat from the heating element to the lower bowl 12. High wattage for the heating element combined with poor heat transfer efficiency result in heat being wasted in the base 10 which prevents normal cooling of the lower bowl 12 during brew time and filter time.

The switch cut-off time should be short enough to overcome heating the entire lower bowl, yet long enough to provide a good margin of safety for operation of the bimetal element 42 and the thermal cut-out 40 operated thereby. This is accomplished by proper design of the thermal cut-out as disclosed in copending application Serial No. 171,711, filed July 1, 1950. The brew time should ideally be from three to four minutes at a brew temperature between 190° F. and 210° F. in accordance with recommendations of the National Coffee Roasters Association. The filter time should be approximately one minute so as to provide sufficient filtering, yet not add excessive infusion time to the brew time.

We have observed in many types of commercially available vacuum type coffee makers that the usual tendency is for the heat-up time to be long due to lack of good efficiency of heat transfer from the heating element to the lower bowl 12, and that with poor heating efficiency the ambient temperature in the base chamber 10 is so high that the lower bowl fails to cool sufficiently to permit acceptably short brew time and specifically that an efficient heating element with efficient heat transfer to the lower bowl causes both short heat-up time and short brew time.

After testing many types of heating element constructions and arrangements for providing good heat transfer to the lower bowl, we have found that the heating element HE, if it has the following characteristics, provides for superior efficiency to attain the above-mentioned desirable results.

Figure 4:
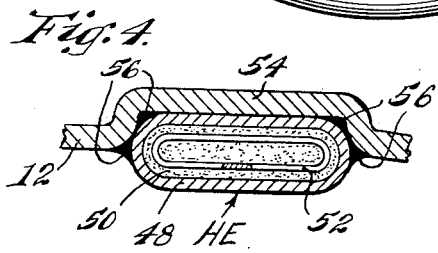
Figure 4 is an enlarged sectional view on the line 4—4 of Figure 3 showing in greater detail the connection of the heating element to the bowl and the construction of the bowl at this point.

One type of heating element is disclosed in Figure 4 comprising a sheath 48 of copper or other metal having high thermal conductivity, filled with an originally plastic insulating material 50 such as argillous or clay-like material, including aluminum oxide for high heat conductance, and a resistance element 52 imbedded in the insulating material 50 and filled with it. Such a heating element may be formed as disclosed in the Smith Patent No. 1,951,176, issued March 13, 1934, by the extrusion process wherein the plastic insulating material 50 and the resistance wire 52 are extruded with a round cross section into a round copper tube which is thereafter formed to the shape shown in Figure 3 and flattened as shown in Figure 4. This flattening compacts the insulating material to provide good thermal conduction from the resistance wire 52 to the sheath 50 and the entire heating element is cured and fired to render the insulating material 50 ceramic-like in character.

The heating element HE is then soft-soldered to the bottom of the lower bowl 12, the bowl preferably having an annular depression 54 formed therein to receive the heating element to substantially half its depth which, in addition to providing a channel for the solder indicated at 56, insures that the sheath 48 will be connected by the solder to the bowl over an area greater than half the total area of the sheath. This maximizes for thermal efficiency or heat conduction from the sheath 48 to the bowl 12. With such an arrangement, we have been able to decrease the heat-up time to about 8½ minutes, brew time to about 3¼ minutes, for a total time of 11¾ minutes for an entire eight cup coffee making operation with only an 800 watt heating element. The 3¼ minutes brew time includes about 1 minute switch cut-off time and about 1 minute filter time.

Previously, most heating element sheaths have been silver soldered or brazed to the lower bowl of the coffee maker against a flat surface and this is objectionable from a practical servicing-in-the field standpoint. If such an element becomes inoperative such as by burning out, it is impractical for a repair station to service the coffee maker but instead it must be returned to the factory and repairs there necessitate heating to a temperature of 1200° to 1400° F. in order to remove the inoperative element and replace it with a new one. This temperature damages the finish of the coffee maker and necessitates stripping and replating thereof. By the time the coffee maker is returned to the customer, the cost and time does not warrant the repairs and there is considerable loss in customer satisfaction.

We therefore use soft solder indicated at 56 to bond the heating element HE to the lower bowl 12 so that a serviceman may simply invert the lower bowl over a hot plate capable of heating the bowl to a temperature in the range of 400° to 600° F., whereupon he can lift off the defective element, drop in position a factory-tinned replacement element. The temperatures involved do not harm the finish (usually plated) of the coffee maker and is a job that can be readily and quickly performed by a serviceman.

Having determined that heating element efficiency was a very important factor and that the heating element must impart its heat as rapidly and as efficiently as possible to the lower bowl, we provided the annular depression 54 for the heating element HE to increase the soldered area as much as possible, thus providing for maximum efficiency in heat transmission. The heating element being flattened aids in this respect also as well as the use of copper or similar metal having high heat conductivity. The arrangement disclosed is efficient and simple to manufacture, and the heating element can be removed at any appliance service station and readily replaced, the only heating means necessary for heating the bowl 12 being an ordinary hot plate of small enough diameter to be received into the lower bowl with the bowl in inverted position. Such a hot plate would draw less than 1000 watts of current.

In a few minutes the solder melts permitting the defective element to be lifted off with a pair of pliers and a factory-tinned replacement element to be lowered into position on the inverted pot whereupon the hot plate can be de-energized and the assembly cooled by electric fans until the solder solidifies. With such a construction, there is excellent and efficient heat transfer because of the flattened shape of the heating element and by reason of the sheath 48 being of high thermal conductivity and actual metal to metal contact from the sheath to the bowl through the solder which contacts approximately substantially half way around the sheath.

During a normal coffee-making operation, the maximum temperature encountered on the solder between the heating element and the bowl is approximately 340° F. Thus any solder similar to the following types can be used:

| Ingredients | Flow Point, °F. | Melting Point, °F. |
| --- | --- | --- |
| 50% tin, 50% lead | 358 | 420 |
| 100% tin | 450 | 450 |
| 5% silver, 95% cadmium | 380 | 600 |

So called "soft" solders which melt at 800° F. as distinguished from "hard" solders such as silver solders and brazing solders that melt at 900° and up are also commercially available and are preferable to those that melt at less than 600° F.

The heating element HE using ceramic-like insulation 50 is capable of withstanding the temperatures necessary for silver soldering or brazing, but by using solders of the type above listed, there is less thermal strain on the insulation resulting from soldering the heating element into position.

Figure 5:
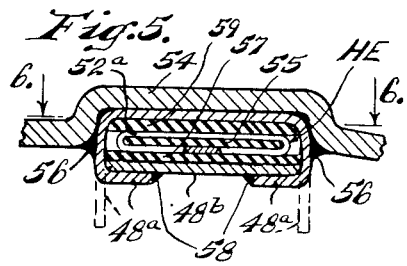
Figure 5 is a similar sectional view showing another form of heating element that can be attached by our method to the vessel.
Figure 6:
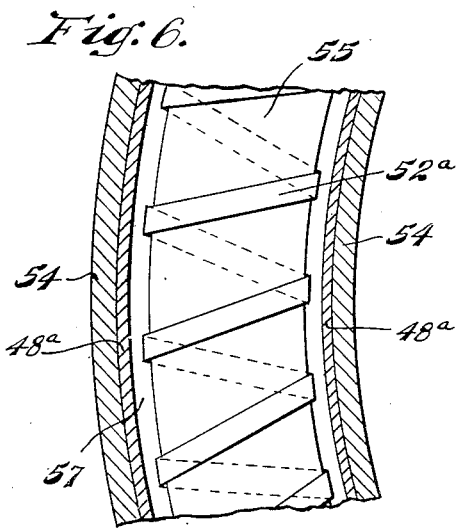
Figure 6 is a sectional view on the line 6—6 of Figure 5 to show constructional details thereof.

Also the melting points running up to 800° F. are low enough that a mica-insulated heating element may be used when it is soft-soldered to the vessel as disclosed. In Figure 5, I show such a construction wherein the sheath comprises a pair of elements 48a and 48b formed preferably of copper or the like with the element 48a initially open as indicated by the dotted lines to receive three insulation washers 55, 57 and 59 formed of mica or the like. The washer 55 has a resistance ribbon 52a wound thereon as shown in Figure 6 and after insertion of the elements 55, 57 and 59, the sheath element 48b, which is a copper washer, is inserted and the flanges of the sheath 48a bent down as shown by solid lines after which they may be soldered as at 58 if desired. A heating element of this construction is soft-soldered into the annular depression 54 of the bowl 12 in the same manner as the heating element disclosed in Figure 4.

While the modified construction of Figures 5 and 6 is not quite as durable as the construction of Figure 4, it is extremely efficient and permits the use of mica insulation together with less manufacturing problems which makes for a less expensive heating element having the thermal conduction efficiency resulting from soft-soldering the same in a groove of the vessel as disclosed in Figures 1 to 4.

Some changes may be made in the construction and arrangement of the parts of our heating element for vacuum type coffee makers and the like without departing from the real spirit and purpose of our invention, and it is our intention to cover by our claim any modified forms of structure or use of mechanical equivalents which may be reasonably included within their scope.

We claim as our invention:

In combination with a vessel for heating liquids, said vessel having a bottom wall, a heating element capable of attaining a temperature in excess of 800 degrees F. when energized at a time the vessel does not contain liquid and including a metallic sheath, said sheath being soldered throughout substantially a major portion of the area thereof to said bottom wall with a solder having a melting point less than 800 degrees F.

(References on following page)

References Cited in the file of this patent

UNITED STATES PATENTS

| Number | Name | Date |
|---|---|---|
| 1,046,103 | Parkhurst | Dec. 3, 1912 |
| 1,697,157 | Backer | Jan. 1, 1929 |
| 1,731,472 | Murray | Oct. 15, 1929 |
| 1,994,323 | Peirce | Mar. 12, 1935 |
| 2,189,127 | | |
| 2,223,450 | | |
| 2,248,812 | | |
| 2,262,286 | | |
| 2,292,854 | | |
| 2,504,728 | | |
| 2,552,420 | | |
| 2,189,127 | Brannon | Feb. 6, 1940 |
| 2,223,450 | Jepson et al. | Dec. 3, 1940 |
| 2,248,812 | Cretors | July 8, 1941 |
| 2,262,286 | Ireland | Nov. 11, 1941 |
| 2,292,854 | Wilcox | Aug. 11, 1942 |
| 2,504,728 | Purpura | Apr. 18, 1950 |
| 2,552,420 | Frankel | May 8, 1950 |